United States Patent Office 3,426,527
Patented Feb. 11, 1969

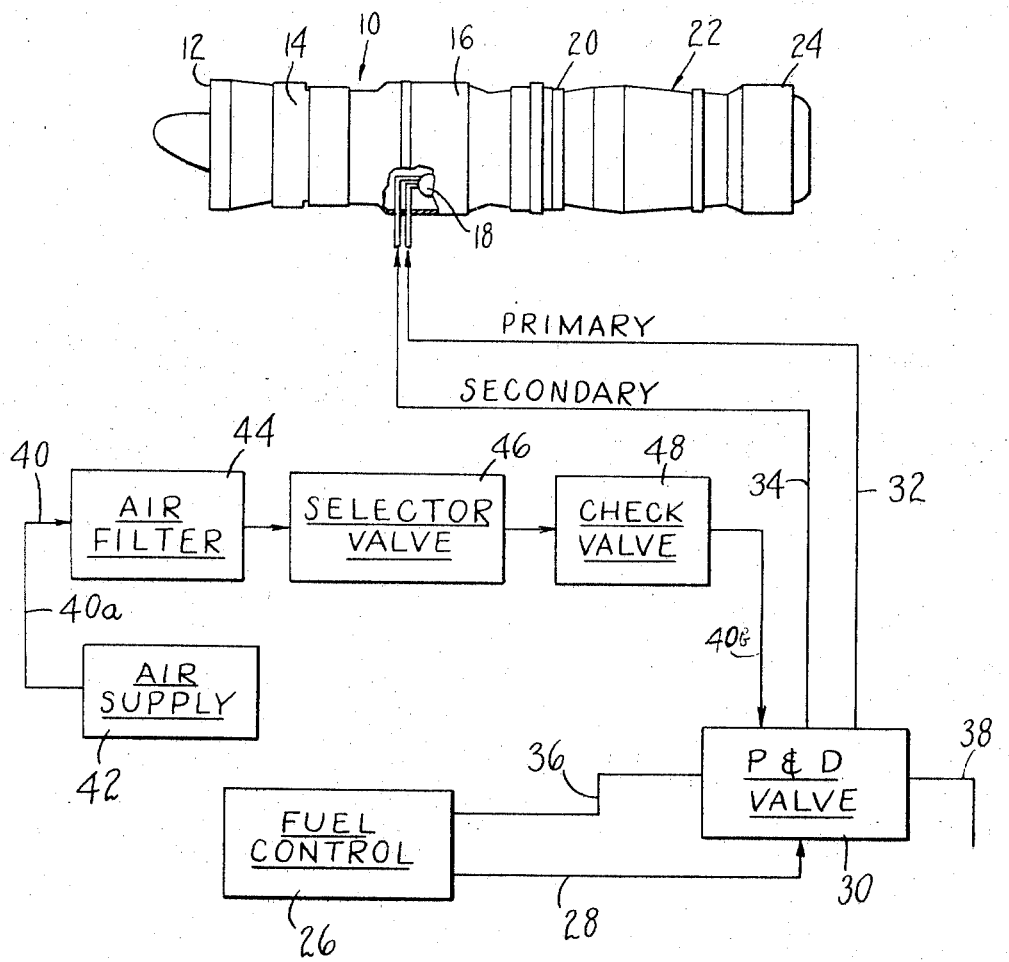

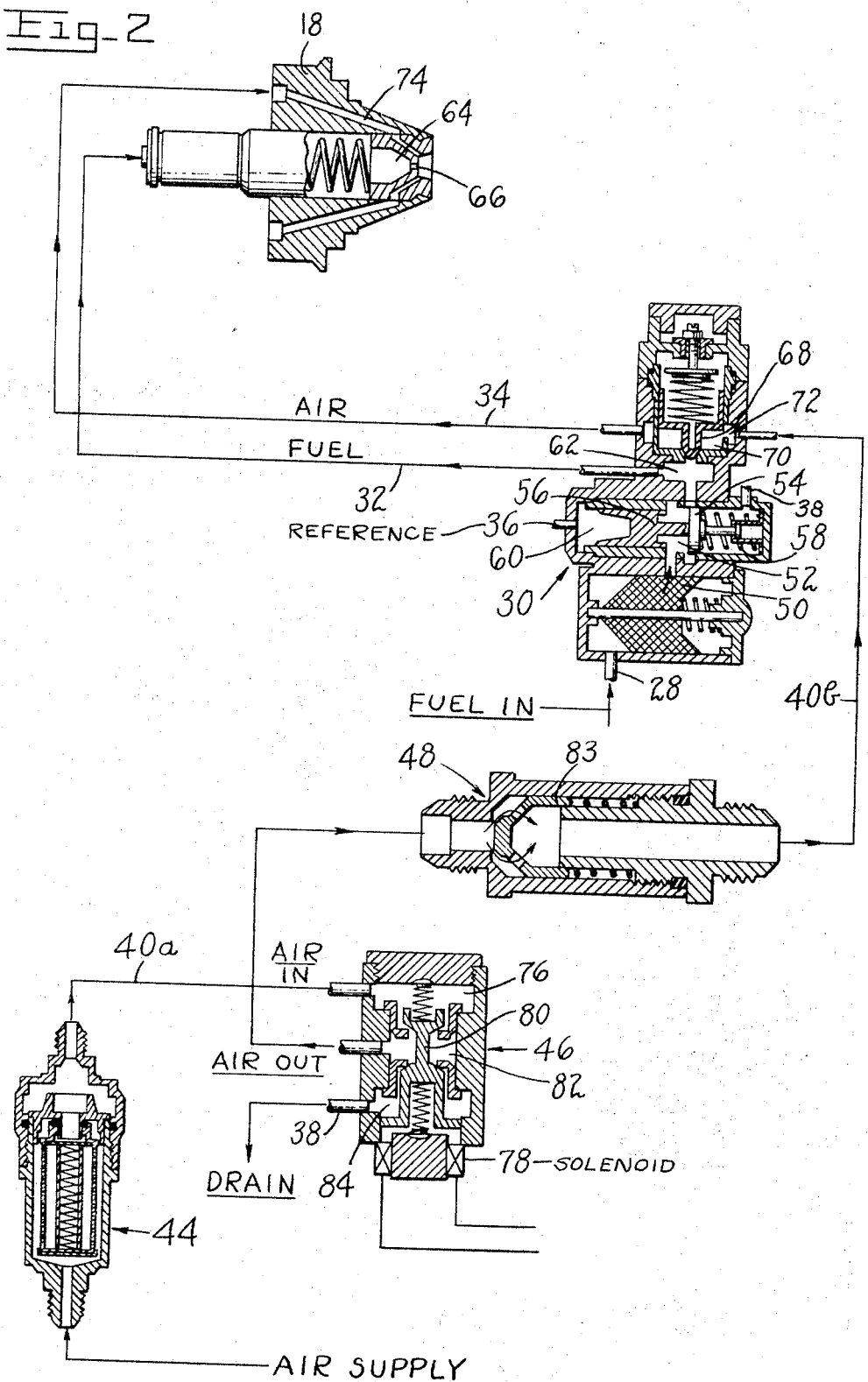

3,426,527
STARTING SYSTEM FOR GAS TURBINE ENGINES
James G. O'Connor, Manchester, Conn., assignor to United Aircraft Corporation, East Hartford, Conn., a corporation of Delaware
Filed Dec. 28, 1966, Ser. No. 605,297
U.S. Cl. 60—39.14         5 Claims
Int. Cl. F02c 7/26; F02g 3/00; B05b 7/06

ABSTRACT OF THE DISCLOSURE

A gas turbine engine fuel system wherein fuel is injected through both flow paths of dual flow injection nozzles during normal operation but through only one during startup operation with air or other atomizing fluid being injected through the other.

---

This invention relates to apparatus and a method for improved starting of gas turbine engines. More particularly, this invention relates to improved apparatus and a method for starting gas turbine engines at very low temperatures while using viscous fuels through the injection of air or other gas.

The starting of gas turbine engines under cold temperature conditions has been a persistent problem. The problem is a direct function of the viscosity of the fuel involved, and the problem is encountered both in aircraft gas turbine engines using the relatively heavy standard gas turbine engine fuels in low temperature land regions or for high altitude starts and also in land or sea based gas turbine engine installations where it is desired to use even heavier fuels such as standard diesel fuel. The low temperature causes the fuel to become quite thick, even approaching a jelly consistency. The viscous fuel is not properly atomized by the fuel injection nozzles, and thus an ignitable fuel spray is not achieved.

The problem of gas turbine engine ignition at low temperature has been recognized in the art for a long time, and proposals have been made to overcome the problem by providing an aditive to the fuel upstream of the fuel nozzles to reduce the viscosity of the fuel before the fuel is discharged through the spray nozzles. Typical of these proposals is the system shown in the U.S. patent to D. P. Bardnard IV, 2,771,741, wherein a gaseous fluid is introduced into the fuel supply line to reduce the viscosity of the fuel. However, these prior proposals have not been as effective as is desired, especially for modern high performance gas turbine engines.

In the present invention, rapid starting of gas turbine power plants at low temperature, both on the ground and for high altitude relighting, is realized and assured by the injection of air or other gas into the fuel supply stream as the fuel is being discharged from the fuel injection nozzles. Fuel injection nozzles of the dual flow type are used wherein a primary flow path is provided through a central circular opening in the nozzle and a secondary flow path is provided through an annular flow path about the primary flow path. During engine startup, air or other gas is introduced into the secondary flow path, and the air or other gas impinges on and mixes with the fuel from the primary flow path at the discharge end of the injection nozzle. The impinging annular stream of air or gas leads to an extremely effective and efficient atomization of the primary fuel stream to enhance flame propagation and improve the lighting ability and characteristics of the engine on startup. The air or gas may be from a separate supply or may be compressor discharge bleed air if the engine starter system generates a sufficiently high compressor discharge pressure. Although the following discussion will refer only to the use of air as the injection medium, it will be understood that other gases may also be used.

Accordingly, one object of the present invention is to provide novel apparatus and a novel method for gas turbine engine starting.

Still another object of the present invention is to provide novel apparatus and a novel method for gas turbine engine starting under cold temperature conditions.

Still another object of the present invention is to provide novel apparatus and a novel method for cold weather starting of both land based, sea based and aircraft gas turbine engines and also for cold weather high altitude relighting of aircraft gas turbine engines.

Still another object of the present invention is to provide novel apparatus and a novel method for cold weather starting of gas turbine engines wherein air is mixed with fuel at the discharge end of the fuel injection nozzles to provide an atomized fuel spray for starting.

Other objects and advantages will be apparent from the following detailed description and drawings wherein like elements are numbered alike in the several figures.

In the drawings:
FIGURE 1 is a schematic view of a gas turbine engine with the air injection system of the present invention.
FIGURE 2 is a schematic sectional showing of the air injection system of the present invention.

Referring now to FIGURE 1, a gas turbine engine 10 is shown. Engine 10 has an air inlet 12, a compressor section 14, a combustion section 16 in which fuel injection nozzles 18 inject fuel for burning, and a turbine section 20. Assuming that the engine is being used as a land or sea based installation the structure aft of turbine section 20 may include a free turbine section 22 for extracting power, and a discharge section 24. If the engine were an aircraft gas turbine engine, the structure aft of turbine section 20 would include the usual aircraft gas turbine engine exhaust nozzle structure.

The basic operation of the engine of FIGURE 1 is in accordance with the well known operation of gas turbine engines. Air enters inlet 12, is compressed in compressor section 14 and is then delivered to combustion section 16 where fuel is added through nozzles 18 and burned to produce a high energy, high temperature gas stream. The combustion gas stream is then expanded through turbine section 20 where work is extracted by the turbine to drive the compressor, and the combustion gas stream is then delivered to the free turbine section 22 to extract work for any desired purpose, and the stream is then exhausted through exhaust section 24.

Still referring to FIGURE 1, fuel is delivered from a fuel control 26 via a conduit 28 to a pressurizing and dump valve 30. A primary fuel flow conduit 32 leads from pressurizing and dump valve 30 to fuel nozzle 18, and a secondary fuel flow conduit 34 also leads from pressurizing and dump valve 30 to fuel nozzle 18. Of course, it will be understood that there are a plurality of fuel injection nozzles 18 arranged around the engine, and the primary and secondary fuel flow conduits 32 and 34 communicate with each of the fuel nozzles 18.

Pressurizing and dump valve 30 is of the type well known in the art wherein the fuel supply in conduit 28 is delivered only to primary fuel flow conduit 32 until a predetermined pressure is exceeded, and then fuel is also delivered to secondary fuel flow conduit 34. Fuel control inlet pressure is delivered via a conduit 36 to pressurizing and dump valve 30 for use as a reference pressure in pressurizing and dump valve 30, and pressurizing and dump valve 30 is provided with a drain line 38 for overboard dumping of fuel on engine shut down.

In accordance with the present invention, an air supply conduit 40, having sections 40a and 40b, is connected to secondary fuel flow conduit 34 internally of pressurizing and dump valve 30. Air supply conduit 40 might also be connected directly to secondary fuel flow conduit 34 if desired. An air supply 42, which may be a separate pressurized air bottle, is connected via section 40a of air supply conduit 40 to an air filter 44; filter 44, a selector valve 46 and a check valve 48 being in series flow relationship in air supply conduit 40, and check valve 48 being connected to pressurizing and dump valve 30 by section 40b. Filter 44 assures a clean air flow for the system; check valve 48 prevents fuel from backing up into the air supply when fuel is flowing through secondary fuel flow conduit 34; and selector valve 46 is positioned either to deliver air to check valve 48 or to connect check valve 48 to an overboard drain to dump overboard any fuel that may leak past check valve 48.

Referring now to FIGURE 2, the elements of the fuel flow and air injection system of the present invention are shown in greater detail. Metered fuel enters pressurizing and dump valve 30 from fuel control 26 via conduit 28, and the fuel then passes through a filter 50 to a chamber 52. Chamber 52 is defined by a spool valve having a piston 54 at one end and a piston 56 at the other end, the cross-sectional area of piston 54 being larger than the cross-sectional area of piston 56. The spool valve is loaded to the left by a spring 58, and it is loaded to the right by fuel control inlet pressure introduced by conduit 36 to a chamber 60. When the fuel pressure in chamber 52 reaches a predetermined level, the force resulting from the unequal area between pistons 54 and 56 causes the spool valve to move to the right to connect chamber 52 to a chamber 62. Chamber 62 is connected to primary fuel flow conduit 32 to deliver fuel to a central primary fuel flow passage 64 and thence through discharge orifice 66 of nozzle 18 for injection into the combustion section of the engine.

When the fuel pressure in chamber 62 reaches a predetermined level, a valve 68 which is exposed to the pressure in chamber 62 will be opened and fuel will flow to a chamber 70 and an annular chamber 72 to secondary fuel flow conduit 34. From secondary fuel flow conduit 34, the fuel would then flow to an annular flow conduit 74, conduit 74 being annular with respect to and coaxial with central fuel passage 64 and discharge orifice 66. The fuel in annular conduit 74 would then cooperate with the primary fuel flow from discharge orifice 66 to provide a proper distribution of fuel flow from the nozzle into the combustion section.

The fuel flow through secondary fuel flow conduit 34 occurs only after the fuel pressure in chamber 62 has reached a predetermined level. Prior to the fuel pressure having reached that predetermined level, valve 68 remains closed, and there is no fuel flow in conduit 34. This condition wherein valve 68 is closed to cut off fuel flow to conduit 34 occurs primarily on engine start up so that only primary fuel flow conduit 32 is supplying fuel to nozzle 18 on engine start up.

Still referring to FIGURE 2, advantage is taken of the fact that secondary fuel flow conduit 34 is free of fuel on engine start up by flowing an atomizing air stream through secondary conduit 34 and conduit 74 to impinge on the primary fuel discharge from orifice 66 to provide an improved atomized spray during engine start up. Air from air supply 42 passes through filter 44 and via conduit section 40a to a chamber 76 of selector valve 46. A solenoid 78 is energized to position a spool valve 80 as shown to connect chamber 76 to a chamber 82, and the air then flows to check valve 48. The pressure of the air drives a pintle 83 of check valve 48 to the right against its loading spring to open the valve, and the air then flows via conduit section 40b to chamber 72 of pressurizing and dump valve 30 and thence through secondary fuel flow conduit 34 to annular conduit 74. The air in annular conduit 74 then impinges on the primary fuel flow discharging from orifice 66 and acts as a highly effective atomizing mechanism for producing an adequately atomized fuel spray pattern to facilitate engine starting. Of course, the level of air pressure delivered to chamber 72 is insufficient to cause valve 68 to open.

After engine starting has been accomplished, and at least not later than the time at which the pressure in chamber 62 becomes sufficient to open valve 68, solenoid 78 is deenergized so that spool valve 80 moves downward to close off chamber 76 from chamber 82 and open chamber 82 to a drain chamber 84 which is in turn connected to an overboard drain, which may be drain 38. This venting of chamber 82 reduces the pressure to which pintle 83 of check valve 48 is exposed, and pintle 83 is then driven to the left to its closed position by its loading spring to prevent the fuel now present in chamber 70 from flowing back through the system to the air supply. However, as a further precaution in the event that fuel should leak past check valve 48, the venting of chamber 82 to drain 38 provides a dump path for any leakage past check valve 48. The deenergizing of solenoid 78 to cut off the atomizing air supply by blocking chamber 76 from chamber 82 can be accomplished either by a manually selected signal or may, if desired, be triggered by a monitoring device which senses and is responsive to the pressure in chamber 62 of the pressurizing and dump valve.

While a preferred embodiment has been shown and described, various modifications and substitutions may be made without departing from the spirit and scope of this invention. Accordingly, it is to be understood that this invention has been described by way of illustration rather than limitation.

What is claimed is:

1. In gas turbine engine having fuel supply nozzles, each of said nozzles having primary and secondary flow passages therein, first conduit means connected to said primary flow passage, second conduit means connected to said secondary flow passage, and a pressurizing valve connected to receive engine fuel flow, said pressurizing valve having first valve means for delivering fuel through said first conduit means to said primary flow passage at a first predetermined fuel pressure and second valve means for delivering fuel through said second conduit means to said secondary flow passage at a second predetermined fuel pressure higher than said first predetermined fuel pressure, a starting system including:

air supply means;

third conduit means connected to deliver a gas through said second conduit means to said secondary flow passage; and third valve means in said third conduit means for controlling gas flow through said third conduit means to said second conduit means, said third valve means having a first position allowing gas flow to said secondary flow passage at engine fuel flow pressures between said first and second predetermined pressures, and said third valve means having a second position preventing gas flow to said secondary flow passage at engine fuel flow pressures higher than said second predetermined pressure.

2. A starting system for a gas turbine engine as in claim 1 wherein said primary flow passage is substantially central of the fuel supply nozzle and wherein said secondary flow passage is annular about said primary flow passage.

3. A starting system for a gas turbine engine as in claim 1 wherein said third conduit means is connected to said pressurizing valve downstream of said second valve means.

4. A starting system for a gas turbine engine as in claim 1 wherein said third conduit means is connected to said pressurizing valve downstream of said second valve means; and including check valve means in said third conduit means between said third valve means and said pressurizing valve; said third valve means connecting said third conduit means to a drain in the second position of said third valve means.

5. A starting system for a gas turbine engine as in claim 4 further including:
   filter means in said third conduit means upstream of said third valve means.

References Cited

UNITED STATES PATENTS

| | | | |
|---|---|---|---|
| 1,441,629 | 1/1923 | Picard | 239—424 XR |
| 2,575,923 | 11/1951 | McMahan et al. | 103—2 |
| 2,731,976 | 1/1956 | Orent et al. | 137—118 |
| 2,858,672 | 11/1958 | Clark | 60—39.14 XR |
| 2,942,790 | 6/1960 | Starkey et al. | 239—405 |
| 3,092,964 | 6/1963 | Martin et al. | 60—39.74 XR |

JULIUS E. WEST, *Primary Examiner.*

U.S. Cl. X.R.

239—424; 60—39.74